(12) United States Patent
Suzuki et al.

(10) Patent No.: US 6,675,332 B1
(45) Date of Patent: Jan. 6, 2004

(54) LSI COMMUNICATION DEVICE WITH AUTOMATIC TEST CAPABILITY

(75) Inventors: Koichiro Suzuki, Kanagawa (JP); Katsuharu Chiba, Kanagawa (JP)

(73) Assignee: NEC Corporation, Tokyo (JP)

( * ) Notice: Subject to any disclaimer, the term of this patent is extended or adjusted under 35 U.S.C. 154(b) by 445 days.

(21) Appl. No.: 09/715,170

(22) Filed: Nov. 20, 2000

(30) Foreign Application Priority Data

Nov. 25, 1999 (JP) ............................................. 11/334612

(51) Int. Cl.⁷ ............................................. G01R 31/28
(52) U.S. Cl. ........................... 714/724; 714/701; 710/7
(58) Field of Search ................................ 714/738, 724, 714/701, 30; 710/14, 7; 365/201; 324/537; 700/12

(56) References Cited

U.S. PATENT DOCUMENTS

| | | | | |
|---|---|---|---|---|
| 5,144,627 A | * | 9/1992 | Horie et al. | 714/724 |
| 5,159,263 A | * | 10/1992 | Yaguchi | 324/537 |
| 5,778,251 A | * | 7/1998 | Kuroiwa et al. | 710/14 |
| 6,023,778 A | * | 2/2000 | Li | 714/726 |

OTHER PUBLICATIONS

"IEEE Standard for a High Performance Serial Bus, IEEE Standard 1394" issued in 1995 by IEEE (pp. i–iii, pp. 7, pp. 33–47, pp. 99–112 and pp. 333–343) with Abstract.

* cited by examiner

Primary Examiner—Stephen M. Baker
Assistant Examiner—Mujtaba Chaudry
(74) Attorney, Agent, or Firm—Sughrue Mion, PLLC

(57) ABSTRACT

A communication LSI device includes a state machine section and a test control section. The state machine section carries out a configuration operation in an idle state in response to a first reset signal. The state machine section changes to the idle state after completion of the configuration operation. The state machine section outputs a flag signal after a predetermined time since the state machine section changes to the idle state. The test control section outputs one the first reset signal to the state machine section in a test mode in response to the flag signal or a second reset signal externally supplied.

16 Claims, 10 Drawing Sheets

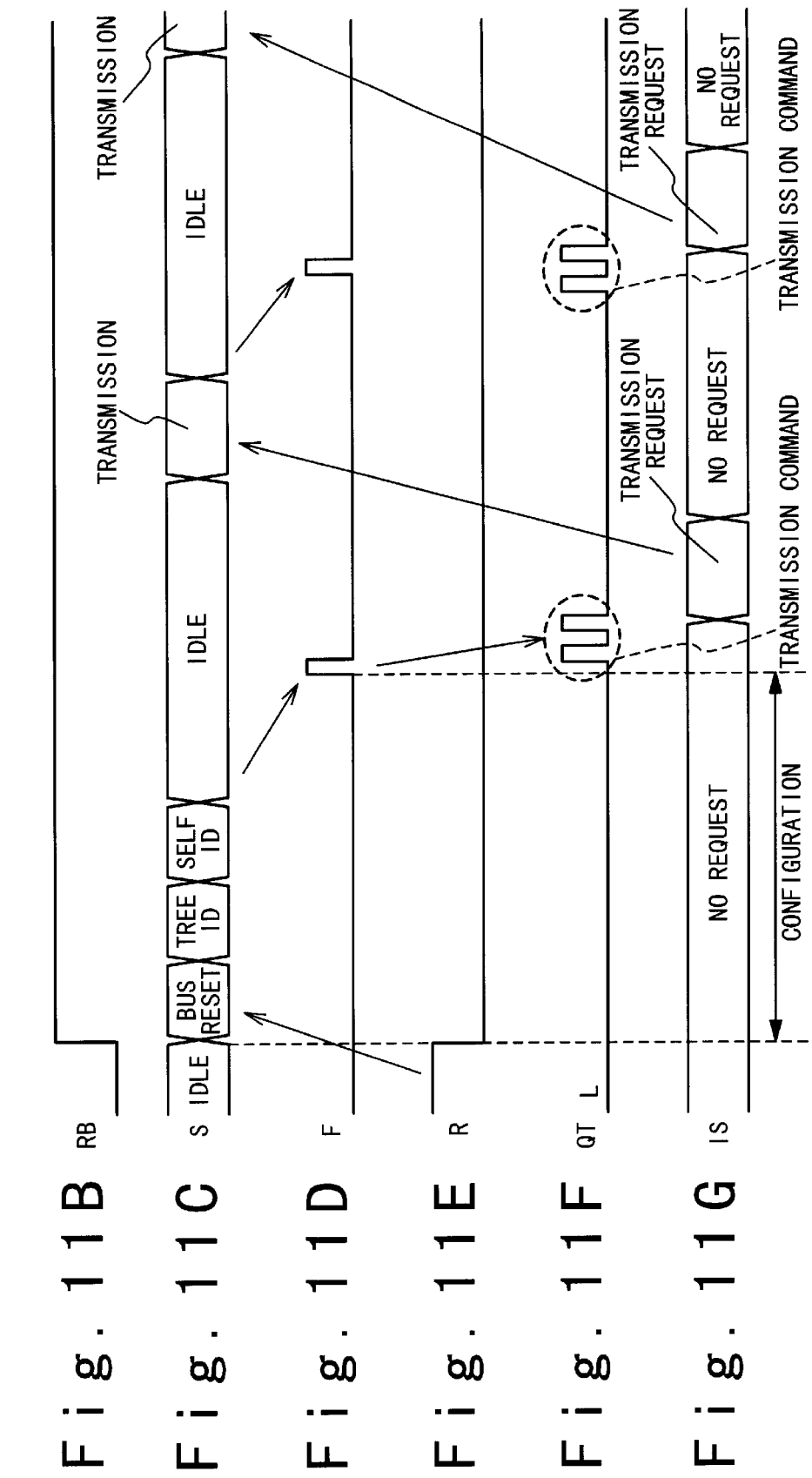

LSI COMMUNICATION DEVICE WITH AUTOMATIC TEST CAPABILITY

BACKGROUND OF THE INVENTION

1. Field of the Invention

The present invention relates to a LSI device used for communication, and particularly to a LSI device used for communication based on a high speed serial bus.

2. Description of the Related Art

A kind of LSI device used for communication is well known which is defined in the "IEEE Standard for a High Performance Serial Bus, IEEE Standard, 1394" issued in 1995 by IEEE (Institute of Electrical and Electronic Engineers), and have been widely used.

The communication LSI device according to the IEEE Standard, 1394 has a control circuit called a physical layer circuit and is structured so as to receive control command signals through a link circuit corresponding to an external upper layer. In practical use of this communication LSI device in a host unit including a high speed serial bus, a plurality of LSI devices are used in correspondence with a plurality of serial buses which are usually included in the host unit. Therefore, the physical layer control circuit has a function to construct a tree connection (tree identifications (Ids) in the tree structure) of the plurality of LSI devices and to carry out configuration including allocation of identification numbers (self IDs) to individual LSI devices in the tree structure.

In general, in a product test process of semiconductor integrated circuits (LSI devices), a reliability test is carried out by use of a bias temperature screening method in which products are operated for a long time at a high temperature so that heat and electric stresses are applied to the products. Thus, initial failures are detected, so that the products having the initial failures are removed to obtain high reliability.

The bias temperature screening method is classified into a static bias temperature screening method and a dynamic bias temperature screening method. In the static bias temperature screening method, a non-operating LSI device is left under a high temperature condition in which only a power source voltage is supplied to the LSI devices. In this case, the circuit does not operate so that a part of the circuit does not receive electric stress. On the other hand, in the dynamic bias temperature screening method, a LSI device to be tested is left under a high temperature condition, and a signal pattern is externally supplied to the LSI device to operate the LSI device steadily. Thus, the test can be carried out in the state that heat and electric stresses are imposed to the LSI device. Therefore, the dynamic bias temperature screening method is much more effective among the bias temperature screening methods.

However, the test environment in which the dynamic bias temperature screening method is carried out needs to be constructed in a closed and limited space such as a constant temperature vessel. Hence, a device such as a pattern generator, which supplies a test pattern for the LSI device to be test, is difficult to be located in the test environment.

FIG. 1 is a block diagram showing the structure of a physical layer circuit 100 of a conventional communication LSI device. Referring to FIG. 1, the physical layer circuit 100 of the conventional communication LSI device is composed of a state machine 1, a timer 2, a link interface (I/F) circuit 3 and an inverter 4. The state machine 1 controls the entire operation of the communication LSI device. The timer 2 is used in the control of a state transit time of the state machine 1. The inverter 4 inverts a low active reset signal RB inputted from a reset terminal TR to output as a high active rest signal R.

The link interface circuit 3 functions as an interface to an external link circuit. The link interface circuit 3 inputs a command signal Q from the external link circuit through a command signal terminal TQ. The interface circuit 3 interprets the command signal Q and outputs an instruction IS to the state machine 1.

The state machine 1 receives a high active reset signal R and starts a predetermined configuration operation. Upon completion of the configuration operation, the state machine 1 outputs a high active flag signal F (called subaction gap) to the link interface circuit 3. An output from the timer 2 is supplied to the state machine 1, and the time of the configuration operation such as the time for the flag signal F to be outputted is controlled.

Next, operation of the physical layer circuit 100 of the conventional communication LSI device will be described with reference to FIG. 1 and FIGS. 2A to 2F. FIGS. 2A to 2F are timing charts showing waveforms at respective sections of the conventional physical layer circuit. At first, when the reset signal RB of a low level shown in FIG. 2A is inputted from the reset terminal TR, the reset signal R as the output of the inverter 4 is changed to a high level, as shown in FIG. 2D. At this time, the state machine 1 is reset to enter into an "idle" state. Thereafter, the reset signal R is changed to the low level when the reset terminal changes to the high level, and the reset state of the state machine 1 is released. Upon the release of the reset state, the state machine 1 starts a configuration operation as follows.

That is, in the configuration operation, under time control by the timer 2, the state S of the state machine 1 changes to a "bus reset" state, a "tree ID" state, a "self ID" state and the "idle" state, as shown in FIG. 2B. In the "bus reset" state, a serial bus as a connection target is initialized. In the "tree ID" state, a tree structure is constructed to include another communication LSI device in a device associated with the target serial bus. In the "self ID" state, identification numbers are allocated to the respective communication LSI devices in the tree structure. Then, the state S of the state machine 1 returns to the "idle" state. When the timer 2 counts a predetermined time after the return of the state machine 1 to the "idle" state, the state machine 1 then outputs a pulse of the high level as the flag signal F to end the configuration operation, as shown in FIG. 2C.

The link interface circuit 3 is not inputted with a command signal Q from an external link circuit to the end of the configuration operation. As a result, the command signal terminal TQ is in the low level and the instruction IS indicates "no request", as shown in FIG. 2F.

After completion of the configuration operation, the state S of the state machine 1 keeps staying in the "idle" state, waiting for a command signal to be inputted through the command signal terminal TQ from the external link circuit. Upon input of a transmission command signal from the command signal terminal TQ, the link interface circuit 3 outputs a "transmission request" instruction as an instruction IS to the state machine 1, as shown in FIG. 2F. Upon receipt of the "transmission request" instruction, the state machine 1 is changed to a "transmission" state to execute transmission operation, as shown in FIG. 2b. Then, the state machine 1 returns to the "idle" state. When the timer 2 counts a predetermined time after the return of the state machine 1 to the "idle" state, the state machine 1 outputs a pulse of the high level as the flag signal F, as shown in FIG. 2C.

As described above, the conventional communication LSI device does not operate after the end of the configuration operation unless a pattern signal (command signal) is inputted to the internal circuit of the LSI device is through the external command signal terminal TQ.

Also, in the closed test environment necessary for carrying out the dynamic bias temperature screening, even if the communication LSI device to be tested can be stored in a constant temperature vessel after the configuration operation, it is impossible to connect a pattern generator with the external terminal TQ of the LSI device to be tested to supply a test pattern. Therefore, a predetermined test cannot be carried out.

In conjunction with the above description, a single chip microcomputer is disclosed in Japanese Laid Open Patent Application (JP-A-Heisei 5-334463). In this reference, the single chip microcomputer is composed of a latch (207) which detects a standby transit instruction, and a selector 209 which selects the output of the latch (207) and an NMI (masking impossible interrupt) signal (115) based on a TEST signal (117) which sets the single chip microcomputer to a test mode. When the standby transit instruction is executed, the inner NMI signal 110 is generated to release the standby state. Even when the standby transit instruction is executed at the time of the test mode, a circuit is activated to cancel the standby state at the time of the dynamic bias temperature screening operation without input of the NMI signal or the RESET signal.

Also, a testing device of the semiconductor integrated circuit is disclosed in Japanese Laid Open Patent Application (JP-A-Heisei 9-89996). In this reference, the testing device is composed of a multiphase clock generating circuit (4) and an input/output buffer circuits F/FA1 to F/FA10. The multiphase clock generating circuit (4) generates a scan mode signal SM, a normal clock signal CK for operating an internal logic, and a scan clock signal SCK for operating boundary scanning from s test terminal BT for the dynamic bias temperature screening method. The input/output buffer circuits F/FA1 to F/FA10 have a boundary scan test function. The Scan clock SCK is distributed to the input/output buffer circuits F/FA1 to F/FA10 and a normal clock is distributed to the input/output buffer circuits F/FA1 to F/FA10 and F/FB1 to F/FB10. The scan mode signal SM is connected to all the input/output buffer circuits F/FA1 to F/FA10 and F/FB1 to F/FB10 to switch between a scan mode and a normal mode. The output of the last stage F/FA10 of the boundary scanning is connected with the input of the first stage F/FA1, to form a boundary scanning loop. The single BT terminal allows static burn-in test to be carried out while operating the internal circuit.

Also, a microcomputer is disclosed in Japanese Laid Open Patent Application (JP-A-Heisei 10-3401). In this reference, when a dynamic bias temperature mode is set through a test terminal (7), a reset generating circuit (4) resets a microcomputer in response to not a reset signal 12 inputted from a reset terminal 6 but a test program end signal 10 which indicates that the execution of a program stored in a test ROM (3) is ended.

SUMMARY OF THE INVENTION

Therefore, an object of the present invention is to provide a communication LSI device which can automatically and repetitively carry out a test operation, and a test method of the same.

Also, another object of the present invention is to provide a communication LSI device which can automatically and repetitively detects a flag signal from a state machine and carry out a test operation in response to the flag signal, and a test method of the same.

In order to achieve an aspect of the present invention, a communication LSI device includes a state machine section and a test control section. The state machine section carries out a configuration operation in an idle state in response to a first reset signal. The state machine section changes to the idle state after completion of the configuration operation. The state machine section outputs a flag signal after a predetermined time since the state machine section changes to the idle state. The test control section outputs one the first reset signal to the state machine section in a test mode in response to the flag signal or a second reset signal externally supplied.

Here, the communication LSI device may further includes a link inter which outputs a first transmission command to the state machine section in response to a second transmission command externally supplied. In this case, the state machine section carries out a transmission operation in the idle state in response to the first transmission command, and then the state machine section changes to the idle state after completion of the configuration operation.

Also, the state machine section may include a timer. In this case, when the timer counts the predetermined time after the completion of the configuration operation, the state machine section outputs the flag signal in the idle state when the timer counts the predetermined time.

Also, the test control section may be set to the test mode in response to a test mode setting signal externally supplied.

Also, the second reset signal may be supplied to the test control section initially once.

In another aspect of the present invention, a method of testing a communication LSI device is attained by (a) setting a test mode; by (b) generating a first reset signal to a state machine section in an idle state in the test mode in response to a second reset signal externally supplied; by (c) carrying out a configuration operation by the state machine section in response to the first reset signal, wherein the state machine section changes to the idle state after completion of the configuration operation; by (d) generating a flag signal from the state machine section when the state machine section is in the idle state; by (e) generating a first transmission command in response to a second transmission command externally supplied; by (f) carrying out a transmission operation by the state machine section in the idle state in response to the first transmission command, wherein the state machine section changes to the idle state after completion of the transmission operation; and by (g) generating the first reset signal to the state machine section in the idle state in the test mode in response to the flag signal.

The state machine section may include a timer. In this case, the (d) generating may be attained by generating the flag signal in the idle state when the timer counts a predetermined time after the state machine section enters the idle state.

Also, the (a) setting may be attained by setting the test mode in response to a test mode setting signal externally supplied.

In order to achieve still another aspect of the present invention, a communication LSI device includes a state machine section, a resetting circuit, a test control section and a link interface section. The state machine section carries out a configuration operation in an idle state in response to a first reset signal, and then the state machine section changes to the idle state. Also, the state machine section carries out a transmission operation in the idle state in response to the first transmission command, and then the state machine section changes to the idle state. Further, the state machine section outputs a flag signal after a predetermined time since the state machine section changes to the idle state. The resetting circuit generates the first reset signal in response to a second reset signal externally supplied. The test control section outputs a second transmission command in a test mode in response to the flag signal. The link interface section outputs the first transmission command to the state machine section in response to the second transmission command.

Here, the state machine section may include a timer. In this case, when the timer counts a predetermined time after the state machine section enters the idle state, the state machine section outputs the flag signal in the idle state when the timer counts the predetermined time.

Also, the test control section may be set to the test mode in response to a test mode setting signal externally supplied.

Also, the third communication command reset signal may be supplied to the test control section initially once.

In yet still another aspect of the present invention, a method of testing a communication LSI device, is attained by (a) setting a test mode; by (b) generating a first reset signal to a state machine section in an idle state in the test mode in response to a second reset signal externally supplied; by (c) carrying out a configuration operation by the state machine section in response to the first reset signal, wherein the state machine section enters the idle state after completion of the configuration operation; by (d) generating a flag signal from the state machine section when the state machine section is in the idle state; by (e) generating a first transmission command in response to the flag signal; by (f) generating a second reset signal to the state machine section in the idle state in the test mode in response to the first transmission command; and by (g) carrying out a transmission operation by the state machine section in the idle state in response to the second transmission command, wherein the state machine section enters to the idle state after completion of the transmission operation.

Here, the state machine section may include a timer. The (d) generating may be attained by generating the flag signal in the idle state when the timer counts a predetermined time after the state machine section enters the idle state.

Also, the (a) setting may be attained setting the test mode in response to a test mode setting signal externally supplied.

Also, the method may further include generating the first transmission command in response to a third transmission command externally supplied.

BRIEF DESCRIPTION OF THE DRAWINGS

FIGS. 11A to 11G are timing charts showing operation waveforms at respective section of the physical layer circuit of the communication LSI device according to the second embodiment in the test mode.

DESCRIPTION OF THE PREFERRED EMBODIMENTS

Next, a communication LSI device of the present invention will be described below in detail with reference to the attached drawings.

A communication LSI device of the present invention is used for a high speed serial bus, which complies with IEEE Standard, 1394. The LSI device of the present invention includes a physical layer circuit as a control circuit for the entire LSI device and is structured so as to receive a control command signal through a link circuit corresponding to an external upper layer, like the above conventional LSI device. In practical use of the communication LSI device of the present embodiment in an host unit including a high speed serial bus, a plurality of LSI devices are used in correspondence with a plurality of serial buses of the host unit, like the conventional LSI device.

The physical layer circuit has a function to construct a tree connection (tree IDs in a tree structure) of the plurality of communication LSI devices and to carry out a configuration operation including allocation of identification numbers (self IDs) to respective LSI devices in the tree structure. The physical layer circuit of the communication LSI device according to the present embodiment detects a flag signal from a state machine as a state transition control circuit, and supplies a signal corresponding to the flag signal to the state machine as a reset signal or an instruction signal. In this manner, setting is achieved so as to carry out a steady circuit operation, thereby to execute a reliability test in a test mode.

Figure 1:
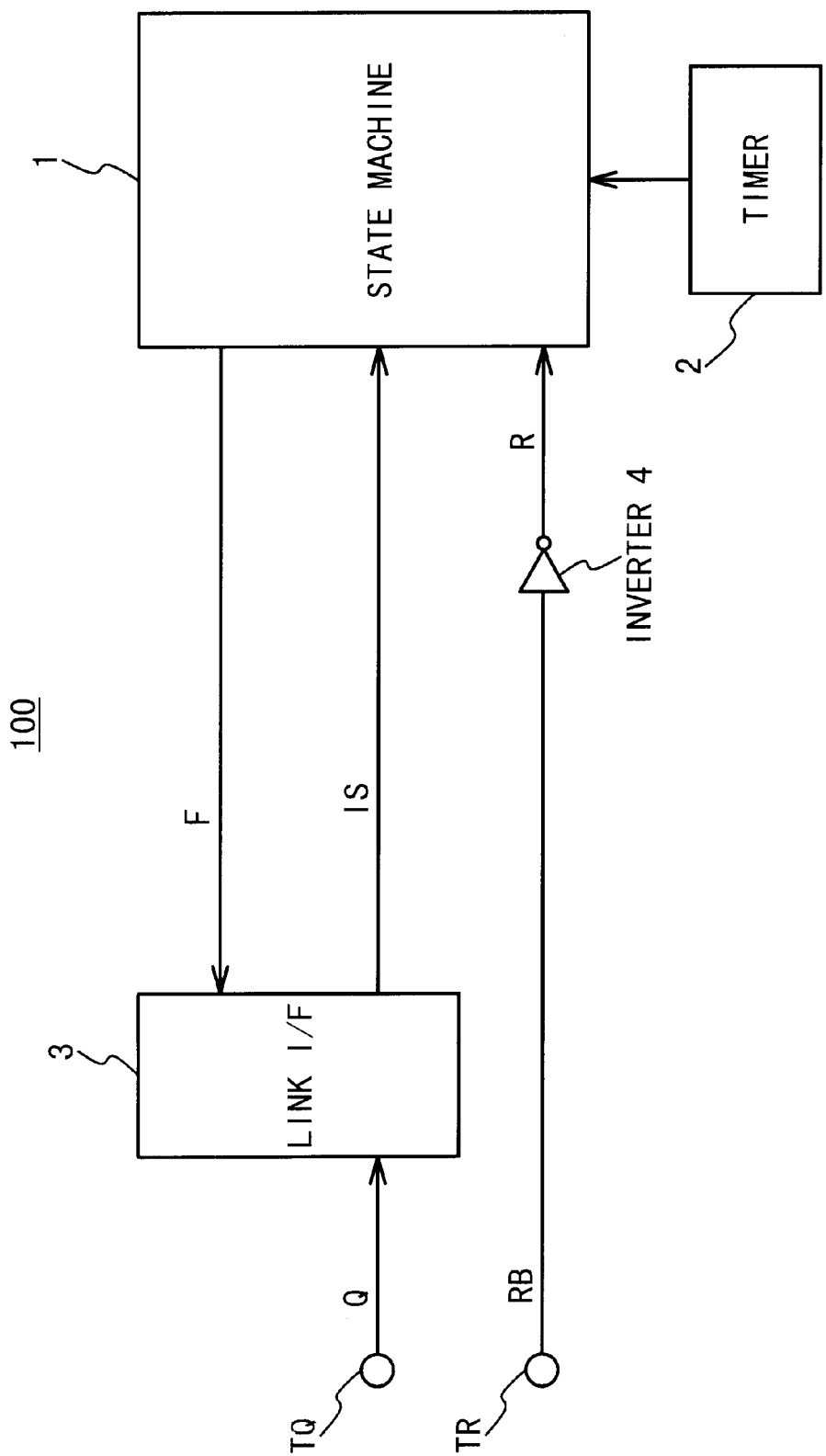
FIG. 1 is a block diagram showing the structure of a conventional physical layer circuit of a conventional communication LSI device.
Figure 3:
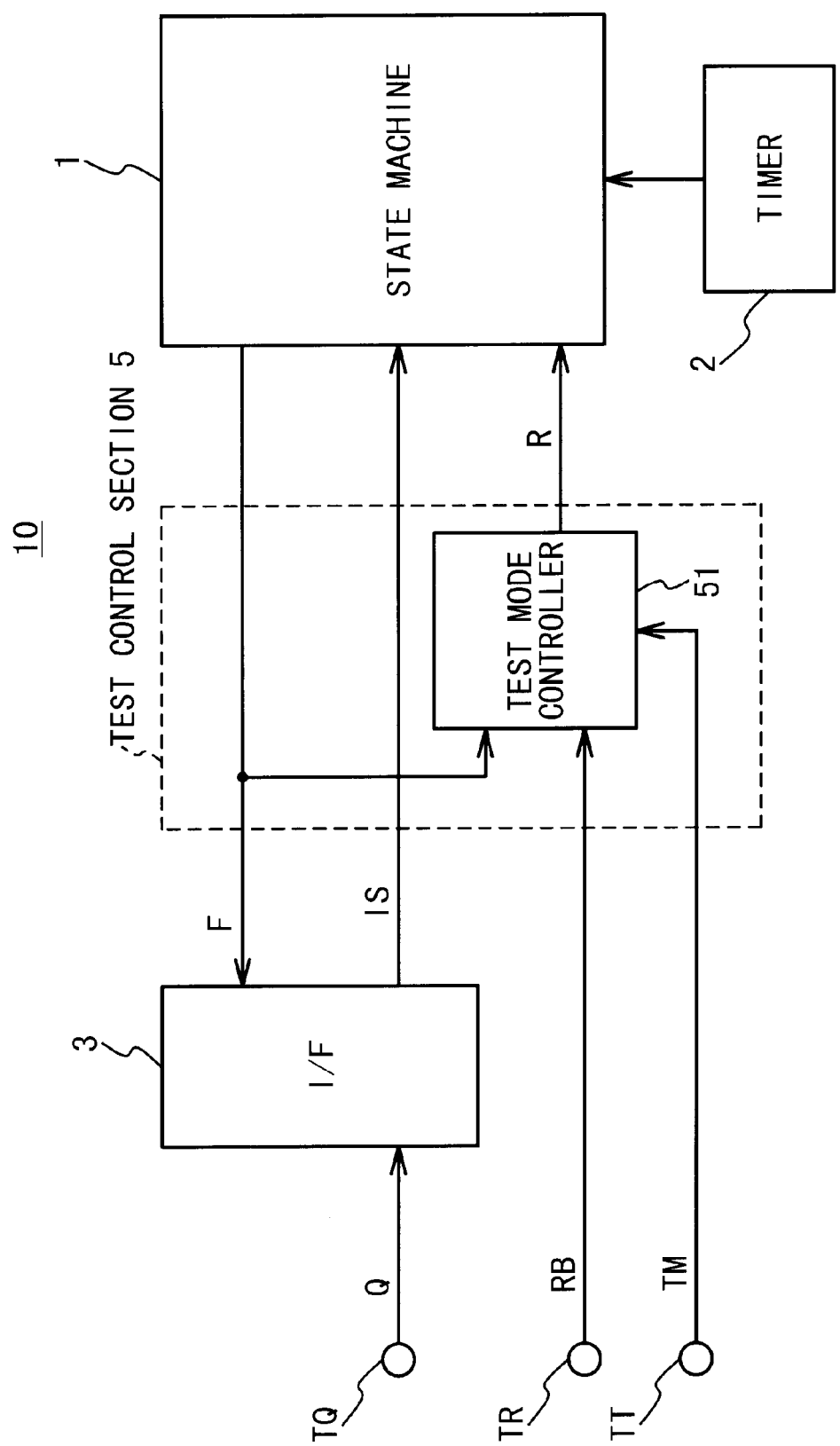
FIG. 3 is a block diagram showing the structure of a physical layer circuit of a communication LSI device according to a first embodiment of the present invention.

FIG. 3 is a block diagram showing the structure of a physical layer circuit of a communication LSI device according to a first embodiment of the present invention. Referring to FIG. 3, components common to FIG. 1 are allocated with common reference symbols/numbers. The physical layer circuit of the communication LSI device is composed of a test control section 5 in addition to a state machine 1, a link interface (I/F) circuit 3, and a timer 2 which are common to the conventional LSI device shown in FIG. 1. The state machine 1 has a function to carry out a configuration operation in which the states of high speed serial bus control are switched in a predetermined order in accordance with external command signals. Thereby, the state of high speed serial bus control can be set to a predetermined setting condition. Also, the state machine 1 controls the entire operation of the entire LSI device.

The timer 2 is used for the state transition times of the state machine 1. The output of the timer 2 is supplied to the state machine 1 to control the time of the configuration operation, e.g., the time when a flag signal F is to be outputted.

The link interface circuit 3 functions as an interface to an external link circuit (not shown) corresponding to an upper layer of the physical layer. The link interface circuit 3 inputs a command signal Q through a command signal terminal TQ from the external link circuit, interprets the command signal, and outputs an instruction IS the test control section 5. The link interface circuit 3 receives the flag signal F.

The test control section 5 is composed of a test mode controller 51 which outputs a pulse corresponding to the flag signal F to the state machine 1 as a reset signal R when a test mode signal TM is in an active state.

The state machine 1 starts configuration operation described later, in response to a high active signal R supplied from the test mode controller 51. Upon completion of the configuration operation, the state machine 1 outputs the flag signal F (called a subaction gap) to the link interface circuit 3 and the test mode controller 51.

The test mode controller 51 of the test control circuit 5 is inputted with a low active reset signal RB, and the test mode signal TM which indicates a test mode when it is in a high level. The controller 51 outputs the reset signal R as a pulse signal synchronized with the flag signal F when the test mode signal TM is in an active state.

Figure 4:
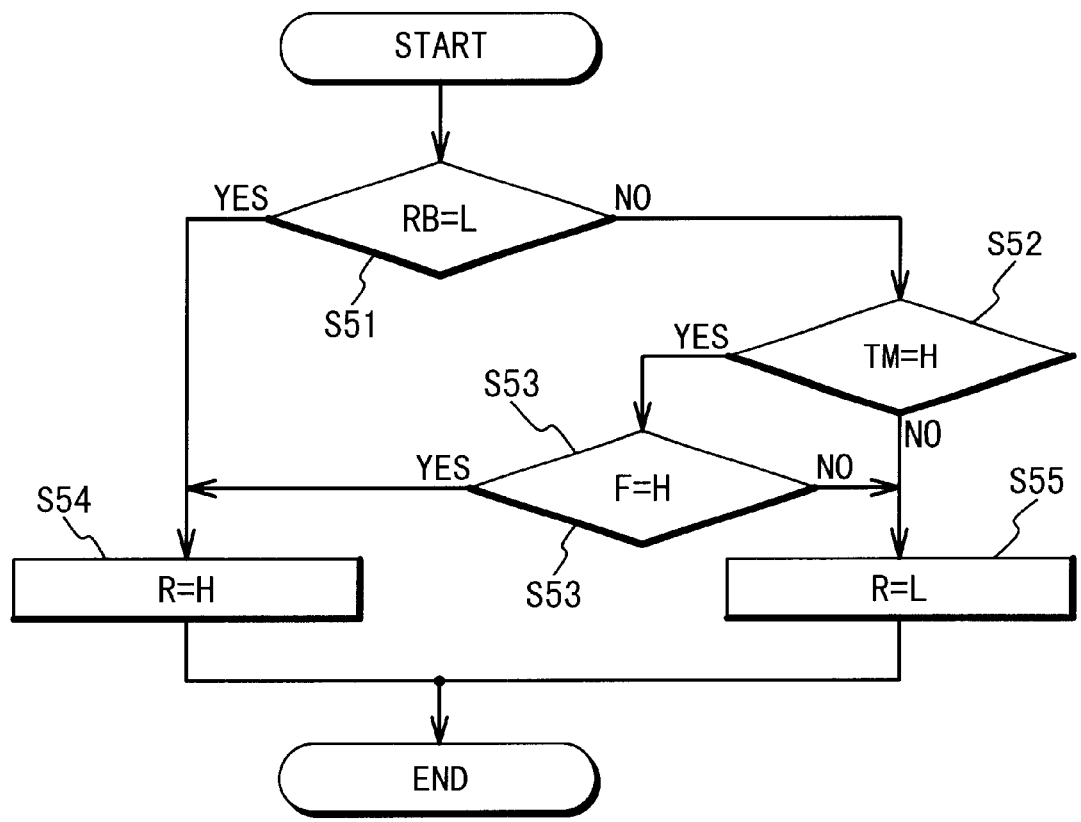
FIG. 4 is a flow chart showing the operation of a test mode controller of the physical layer circuit shown in FIG. 3.

FIG. 4 is a flow chart showing the operation of the test mode controller 51. Referring to FIG. 4, when the reset signal RB is activated to the low level in the step S51, the reset signal R of the high level is outputted (step S54). Further, when the test mode signal TM is active at the high level and the test mode is set in the step S52, the operation flow goes to the step S53. Also when the flag signal F of the high level is inputted, the reset signal R of the high level is outputted. In the other cases, the reset signal R of the low level is outputted (step S55).

Next, operation of the communication LSI device according to the first embodiment of the present invention will be described with reference to FIG. 3 and FIGS. 5A to 5G, and FIGS. 6A to 6G.

FIGS. 5A to 5G are timing charts showing operation waveforms at respective section of the communication LSI device in a normal operation mode. At first, an inputted test mode signal TM is at the low level, and the physical layer circuit 10 operates in the normal mode in response to the test mode signal TM at this low level.

Figure 2:
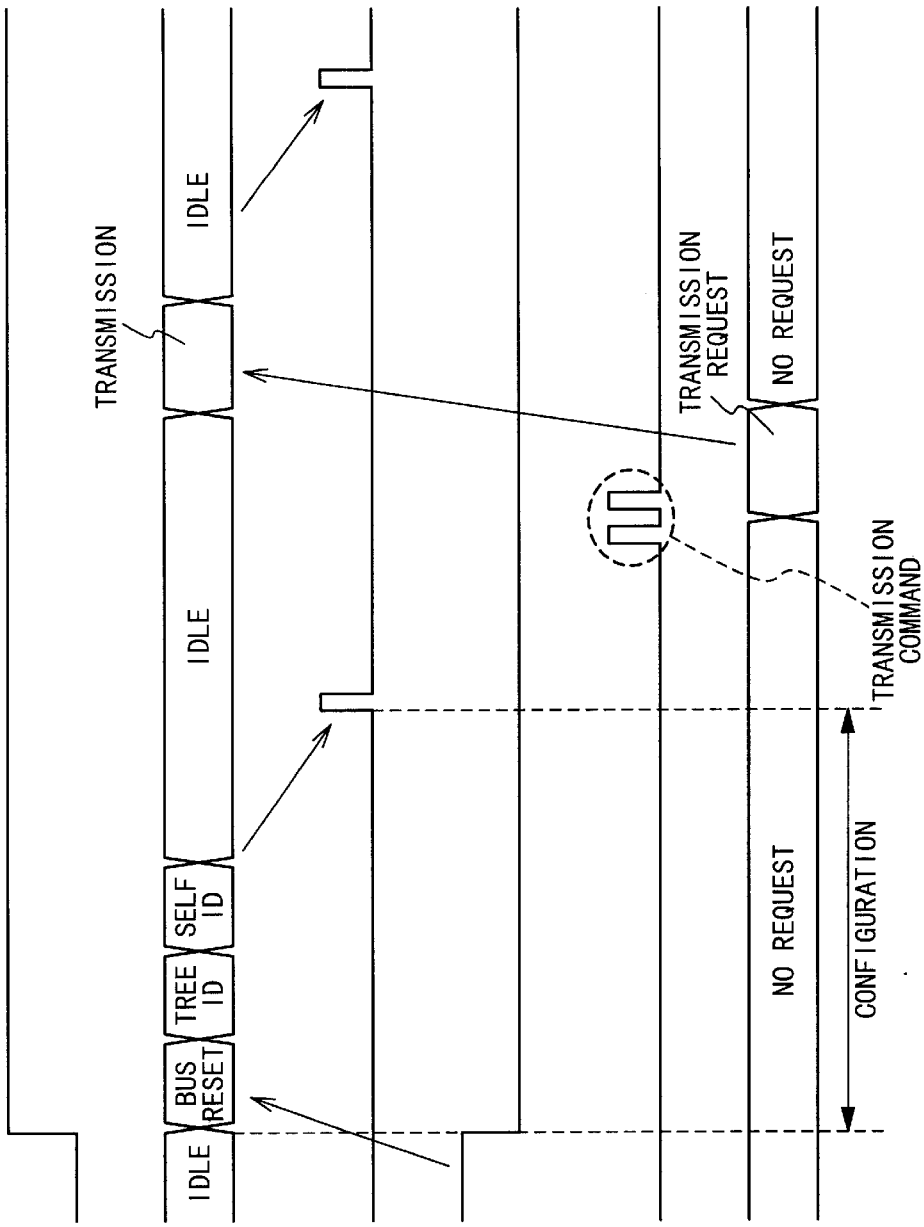
FIGS. 2A to 2F are timing charts showing waveforms at respective sections of the conventional physical layer circuit.
Figure 5:
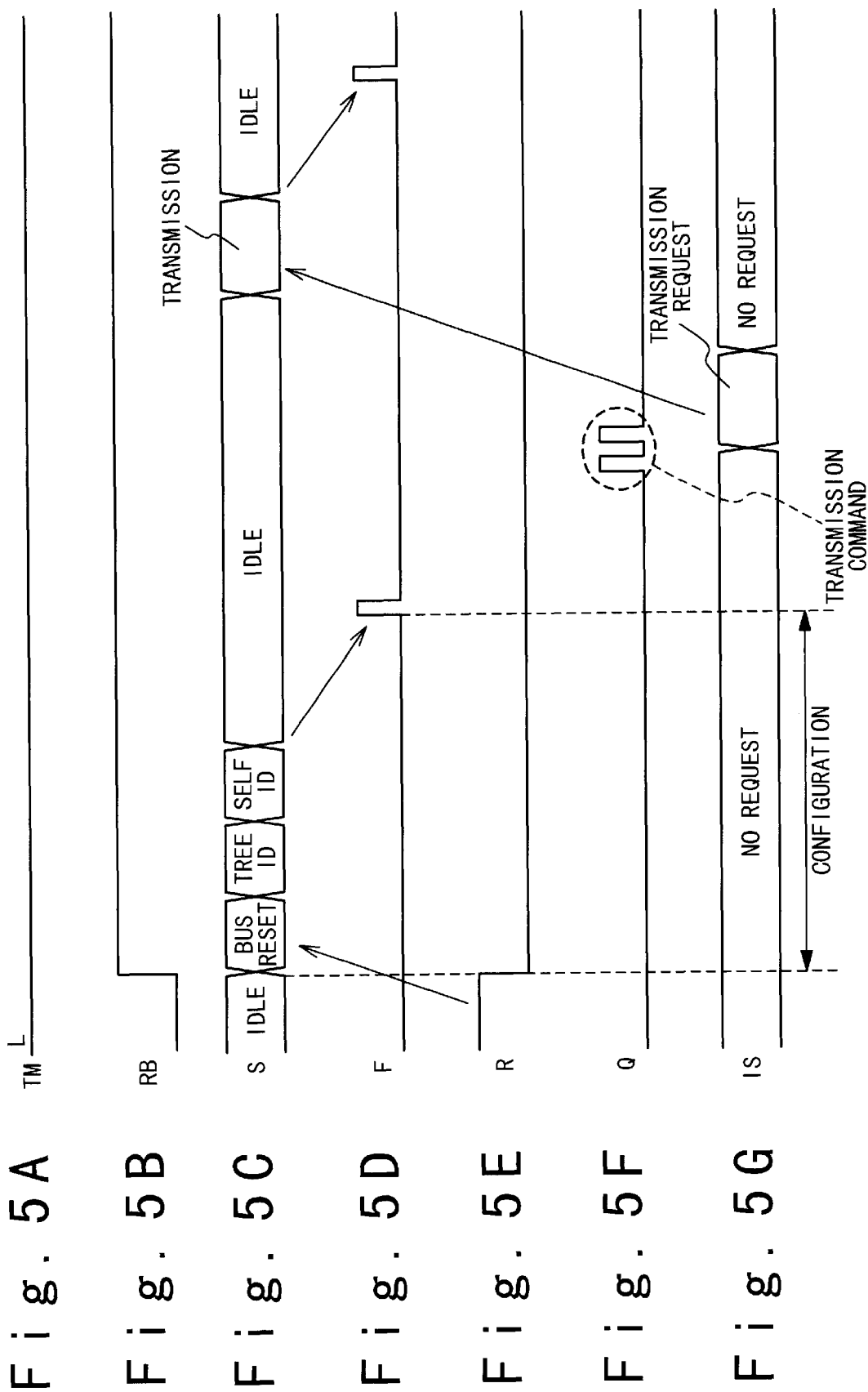
FIGS. 5A to 5G are timing charts showing operation waveforms at respective section of the physical layer circuit of the communication LSI device according to the first embodiment in a normal operation mode.

In operation in the normal operation mode, when a reset signal RB is received through the reset terminal TR as shown in FIG. 5B, the test mode controller 51 sets the reset signal R to the high level, and supplies the reset signal to the state machine 1, as shown in FIG. 5E. The state S of the state machine 1 is reset in response to the reset signal R of the high level and is set to an "idle" state as a standby state, as shown in FIG. 5C. Thereafter, when the reset signal RB goes to the high level as shown in FIG. 2B, the test mode controller 51 sets the reset signal R to the low level, as shown in FIG. 5E. The reset state of the state machine 1 is released in response to the low level of the reset signal R, as shown in FIG. 5C. The state machine 1 starts the following configuration operation upon release of the reset state.

That is, in the configuration operation operation, under time control by the timer 2, the state S of the state machine 1 changes to a "bus reset" state, a "tree ID" state, a "self ID" state and the "idle" state, as shown in FIG. 5C. In the "bus reset" state, a serial bus as a connection target is initialized. In the "tree ID" state, a tree structure is constructed to include another communication LSI device in a device associated with the target serial bus. In the "self ID" state, identification numbers are allocated to the respective communication LSI devices in the tree structure. Then, the state S of the state machine 1 returns to the "idle" state. When the timer 2 counts a predetermined time after the return of the state machine 1 to the "idle" state, the state machine 1 then outputs the flag signal F as a pulse of the high level and the configuration operation ends, as shown in FIG. 5D. The command signal Q is supplied to the link interface circuit 3 from an external link circuit through the command signal terminal TQ. The command signal Q is at the low level during the period from the reset up to the end of configuration operation. Also, the instruction IS indicative of "no request" is outputted from the link interface circuit 3 in response to the command signal Q of the low level.

After the completion of the configuration operation, the state S of the state machine 1 keeps staying in the "idle" state, waiting for a command signal to be inputted to the command signal terminal TQ from the external link circuit.

When a transmission command signal Q shown in FIG. 5F is inputted through the command signal terminal TQ, the link interface circuit 3 interprets the command signal Q and outputs a "transmission request" instruction as an instruction IS to the state machine 1 through the test control section 5, as shown in FIG. 5G. The state S of the state machine 1 transits to a "transmission" state in response to the "transmission request" instruction of the command signal IS, as shown in FIG. 5C. After a transmitting operation of data as a transmission target is carried out, the state S of the state machine 1 returns to the "idle" state, as shown in FIG. 5C. When the timer 2 counts a predetermined time after the state machine 1 returns to the "idle" state, the state machine 1 outputs a flag signal F as a pulse of the high level, as shown in FIG. 5B.

The above operation means that the state machine 1 waits for a command signal in the "idle" state after completion of the configuration operation and the circuit does not operate until the command signal is inputted.

Next, FIGS. 6A to 6G showing the operation in a test mode, in which the test mode signal TM is at the high level indicating an active state, and the physical layer circuit 10 operates in the test mode in response to the test mode signal TM in the high level.

In the operation in the test mode, the reset signal RB of the high level is supplied to the reset terminal TR. The corresponding reset signal R goes to the low level, so that the first configuration operation is started responsively. This operation is quite the same as that of the above configuration operation which is carried out in the normal operation. The first configuration operation is completed upon output of the flag signal F as a pulse of the high level, as shown in FIG. 6D.

Figure 6:
FIGS. 6A to 6G are timing charts showing operation waveforms at respective section of the physical layer circuit of the communication LSI device according to the first embodiment in a test mode.

The test mode controller 51 generates the reset signal R as a pulse signal having a pulse width substantially equal to the flag signal F in response to supply of the flag signal F and supplies the reset signal R to the state machine 1 at timing substantially equal to that of the flag signal F, as shown in FIG. 6E. In response to supply of this pulse R, the state machine 1 is reset and starts a second configuration operation. In the second configuration operation, the state S of the state machine 1 also transits in a manner similar to the first configuration operation. As a result, the second configuration operation is completed upon output of the flag signal F as a pulse of the high level, as shown in FIG. 6D.

Thereafter, the state machine 1 starts a third configuration operation, like the process in which the second configuration operation is started.

Subsequently, the operation as described above, i.e., the configuration operation is repeated until the test is ended by stop of the power supply. In the test mode, it is unnecessary to supply the command signal Q of the high level to the command signal terminal TQ. Therefore, the command signal terminal TQ is constantly kept at the low level, and the command signal IS also constantly indicates "no request".

As described above, the dynamic bias temperature screening operation can be easily carried out to the communication LSI device according to the first embodiment of the present invention. This is because the state machine 1 is reset in response to the flag signal from the state machine 1 in the test mode operation. Therefore, the configuration operation is carried out every time when the state machine outputs the flag signal F.

This repetitive configuration operation is realized through the autonomous operation of the physical layer circuit by supplying the reset signal from the reset terminal only once. Thereafter, it is not necessary to supply a test pattern signal to the physical layer circuit any more. Accordingly, only means for inputting the reset signal is needed for the reliability test unit in the dynamic bias temperature screening method, so that the reliability test unit can be easily constructed.

Figure 7:
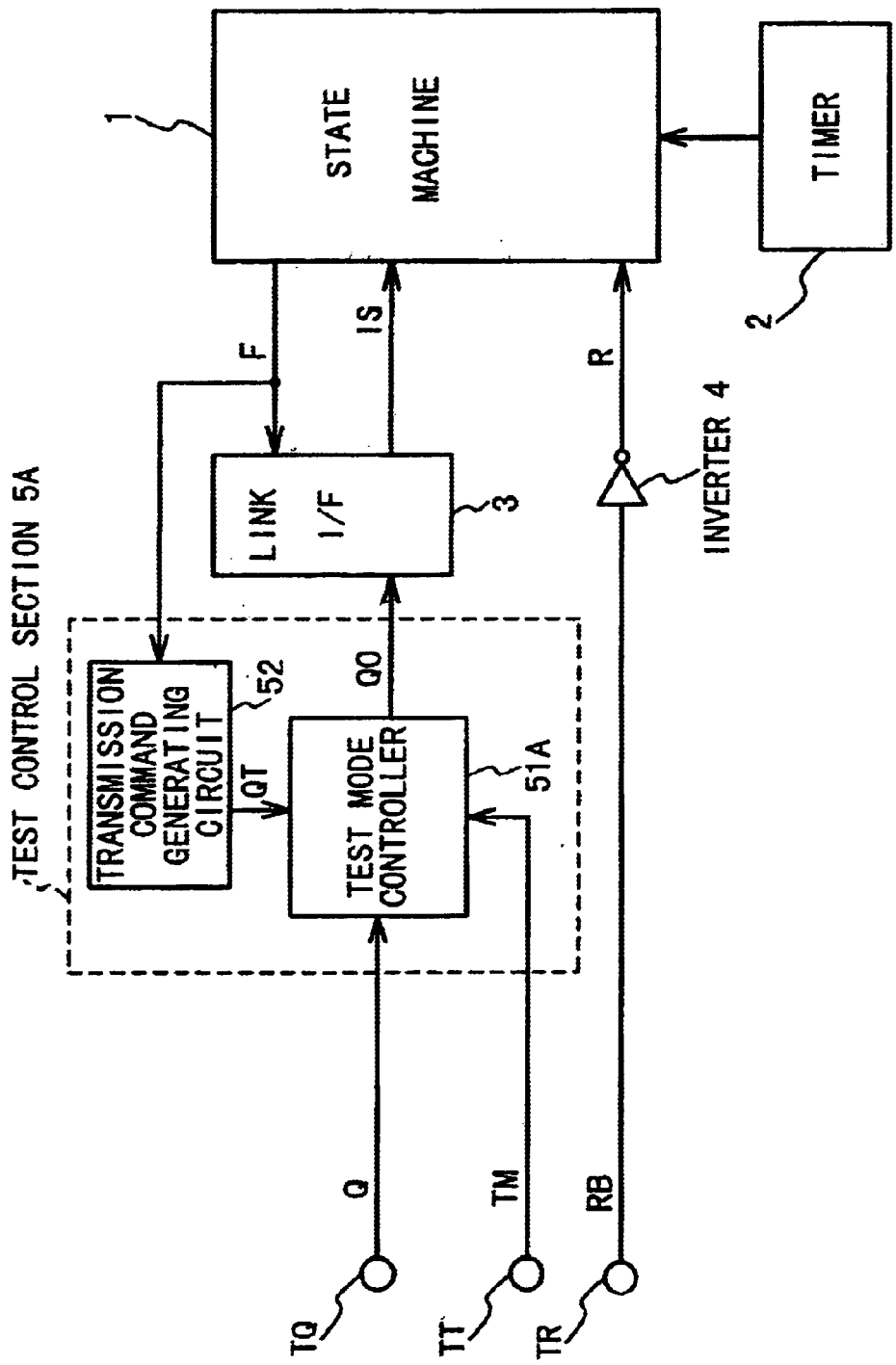
FIG. 7 is a block diagram showing the physical layer circuit of the communication LSI device according to the second embodiment of the present invention.

Next, the communication LSI device according to the second embodiment of the present invention will be described below in detail. FIG. 7 is a block diagram showing the physical layer circuit of the communication LSI device according to the second embodiment of the present invention. In FIG. 7, the same components as in FIG. 3 are allocated with the same reference numerals or symbols.

Referring to FIG. 7, the physical layer circuit 10A of the communication LSI device in the second embodiment differs from that of the previous first embodiment in that a test control section 5A and an inverter 4 are provided in place of the test control section 5. The test control section 5A receives a command signal Q, a test mode signal TM, and a flag signal F and controls the operation of the state machine 1 in the test mode operation. The inverter 4 inverts the reset signal RB from the reset terminal TR to output to the state machine 1 as a reset signal R.

The test control section 5A is composed of a test mode controller 51A in place of the test mode controller 51, and a transmission command signal generating circuit 52. The test mode controller 51A receives the command signal Q from the command signal terminal TQ, the test mode signal TM from the test mode terminal TT, and a transmission command signal QT described later, and outputs and supplies a command signal QO to the link interface circuit 3. The transmission command signal generating circuit 52 receives a flag signal F from the state machine 1, and outputs and supplies the transmission command signal QT to the test mode controller 51A.

Figure 8:
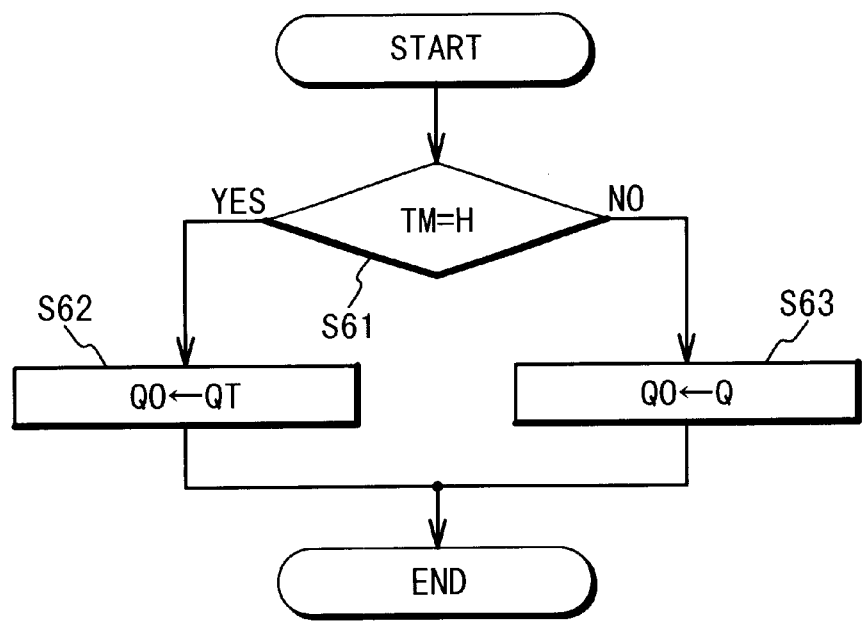
FIG. 8 is a flow chart showing the operation of a test mode controller of the physical layer circuit of the communication LSI device according to the second embodiment.

FIG. 8 is a flow chart showing the operation of the test mode controller 51A. Referring to FIG. 8, when the test mode signal TM is at the active high level, the test mode is set in the step S61. At that time, the transmission command signal QT from the transmission command signal generating circuit 52 is outputted as the command signal QO (step S62). When the test mode signal TM is not at the high level, i.e., at the low level, the normal operation mode is set. At that time, the command signal Q inputted from the external link circuit through the command signal terminal QT is outputted as the command signal QO (step S63).

Figure 9:
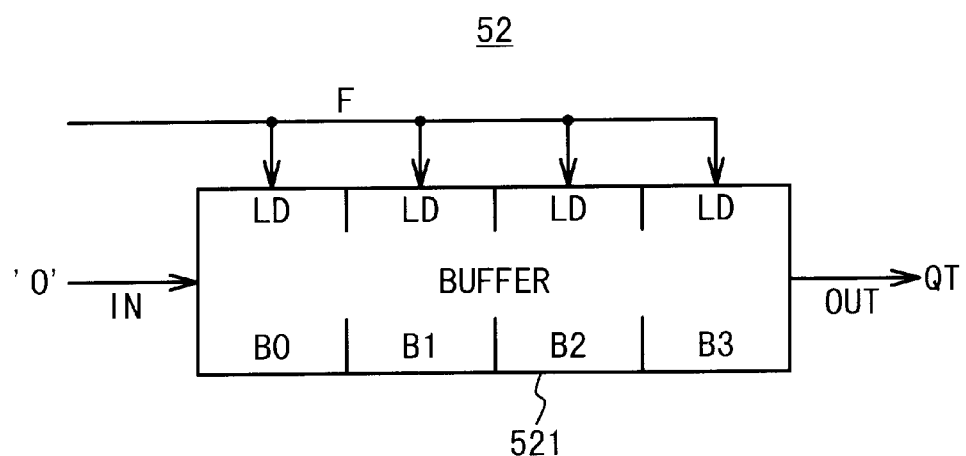
FIG. 9 is a diagram showing a structural example of a transmission command signal generating circuit of the physical layer circuit of the communication LSI device according to the second embodiment.

FIG. 9 is a diagram showing a structural example of the transmission command signal generating circuit 52. Referring to FIG. 9, the transmission command signal generating circuit 52 is composed of a 4-bit buffer 521. The flag signal F is inputted to load terminals LD as respective bits of the buffer 521. The input end for the 0-th bit B0 is inputted with "0", and the transmission command signal QT is outputted from the output end for the third bit B3.

Figure 10:
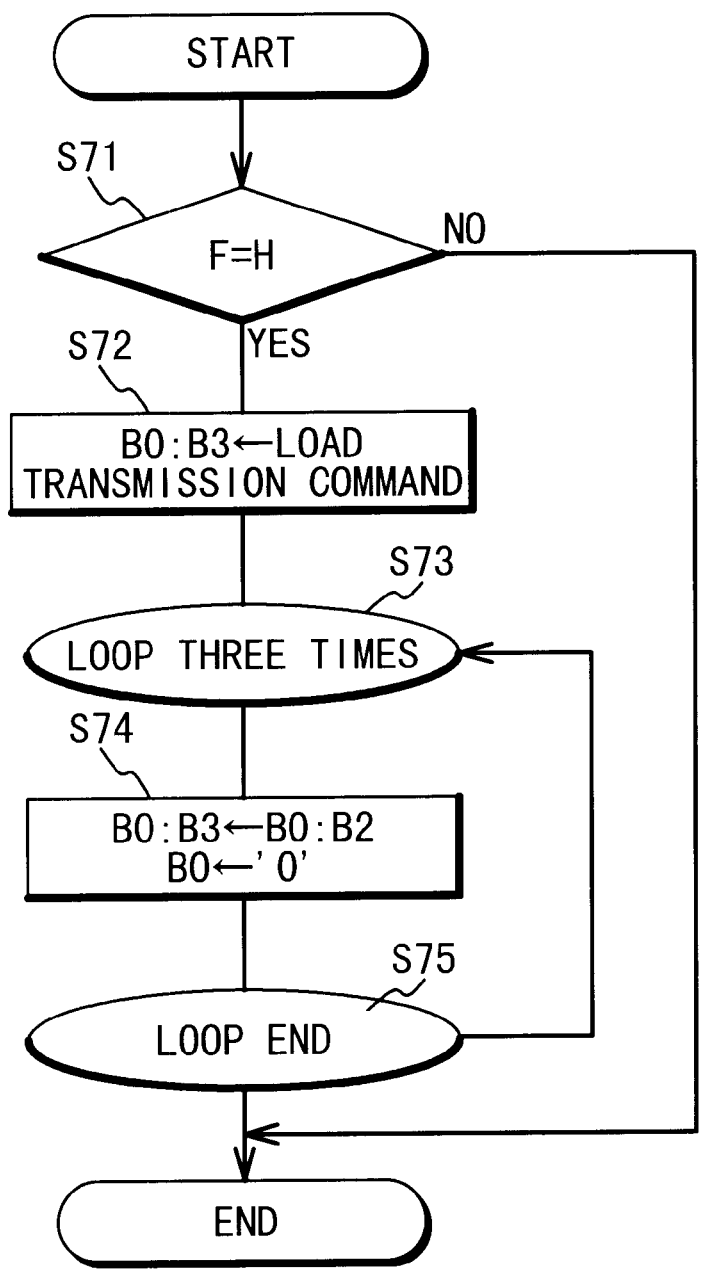
FIG. 10 is a flow chart showing the operation of a transmission command signal generating circuit.

FIG. 10 is a flow chart showing the operation of the transmission command signal generating circuit 52. Referring to FIG. 10, a transmission command signal is loaded to each of bits B0 and B3 of the buffer 521 (written as B0 to B3 in the figure) (step S72) when the flag signal F goes to the high level in the step S71. Thereafter, a shift operation is repeated three times (S73–S75). In each shift operation, the values of the second, first, and 0-th bits are respectively inputted to the third, second, and first bits of the buffer 521 as shown in S74. Also, the level "0" is inputted to the 0-th bit of the buffer 521. Through this operation, the transmission command signal QT is outputted serially from the output end of the third bit.

Next, the operation of the physical layer circuit of the communication LSI device in the second embodiment will be described. FIGS. 11A to 11G are timing charts showing operation waveforms at respective section of parts.

Referring to FIGS. 11A to 11G, at first, if the test mode signal TM is at the low level to indicate an inactive state, the physical layer circuit of the communication LSI devoice in the second embodiment operates in the normal operation mode. The operation in the normal operation mode is quite the same as that in the first embodiment, and explanation thereof will be omitted herefrom.

Next, as shown in FIG. 11A, the test mode signal TM of the high level is inputted to indicate an active state. The physical layer circuit 10A operates in the test mode in response to the test mode signal TM of the high level.

In the operation in the test mode, when the reset signal RB supplied to the reset terminal TR goes to the high level so that the corresponding reset signal R goes to the low level as shown in FIGS. 11B and 11E, the first configuration operation is started as shown in FIG. 11G. This configuration operation is quite the same as that of the configuration operation which is carried out in the normal operation mode according to the first embodiment. The first configuration operation is completed upon output of the flag signal F as a pulse of the high level, as shown in FIG. 1D.

The flag signal F is supplied to the transmission command signal generating circuit 52, which generates a transmission command signal QT in response to the flag signal F and supplies the command signal QT to the test mode controller 51A. The test mode controller 51A generates the command signal QO in response to the transmission command signal QT, and supplies the command signal QO to the link interface circuit 3. The link interface circuit 3 interprets the transmission command signal QO and outputs a "transmission request" instruction as an instruction IS to the state machine 1, as shown in FIG. 11G. The state S of the state machine 1 returns to the "idle" state after the state transits to a "transmission" state in response to the "transmission request", as shown in FIG. 1C, and the transmission operation is carried out. When the timer 2 counts a predetermined time, the state machine 1 outputs a flag signal F.

Subsequently, the transmission command signal generating circuit 52 outputs a transmission command signal QT again, as shown in FIG. 11F. The test mode controller 51A outputs a command signal QO. The link interface circuit 3 outputs the "transmission request" as the instruction IS, and the state S of the state machine 1 transits to the "transmission" state to carry out the transmission operation. Thereafter, the state of the state machine 1 returns to the "idle" state, and the flag signal F is outputted to the test control section 5A and the link interface circuit 3. This operation is repeated continuously.

Also, in the second embodiment, a flag signal transmission command signal is generated from the state machine and the generated transmission command signal is supplied to the link interface circuit 3 in the test mode operation. Therefore, the state machine 1 can repeat the transmission operation every time the state machine 1 outputs the flag signal. Accordingly, the repetitive circuit operation can be achieved so that the dynamic bias temperature screening method can be practiced easily.

In the repetitive circuit operation, a reset signal is inputted only once from the reset terminal, and thereafter, the physical layer circuit autonomously operates. Therefore, it is unnecessary to supply a test pattern signal, so that the test unit for the dynamic bias temperature screening method needs only to be supplied with the reset signal. Thus, the reliability test device can be constructed easily.

As has been described above, in the communication LSI device with the physical layer circuit according to the present invention, the configuration operation is started every time the state machine outputs a flag signal. Accordingly, it is possible to easily practice the dynamic bias temperature screening method in which a pattern generator is difficult to be connected.

In addition, the repetitive circuit operation can be achieved since the physical layer circuit autonomously operates by inputting a reset signal only once. Thereafter, it is not necessary to input a test pattern signal for the test operation of the circuit. Accordingly, only input of a reset signal input is needed for the reliability test unit for the dynamic bias temperature screening method, so that the reliability test device can be easily constructed.

What is claimed is:

1. A communication LSI device comprising:
   a state machine section which carries out a configuration operation in a test mode in an idle state in response to and after a first reset signal, said reset signal being in response to a flag signal, wherein said state machine section reverts back to said idle state after completion of said configuration operation, and said state machine section outputs the flag signal after a predetermined time after the state machine section reverts back to the idle state; and
   a test control section which outputs said first reset signal to said state machine section in a test mode in response to said flag signal or a second reset signal externally supplied,
   wherein an internal status of the device is changed repeatedly only by applying reset signals.

2. The communication LSI device according to claim 1, further comprising:
   a link interface which outputs a first transmission command to said state machine section in response to a second transmission command externally supplied, and
   wherein said state machine section carries out a transmission operation in said idle state in response to said first transmission command, and then said state machine section reverts back to said idle state after completion of said configuration operation.

3. The communication LSI device according to claim 1, wherein said state machine section includes a timer,
   when said timer counts said predetermined time after the completion of said configuration operation, said state machine section outputs said flag signal in said idle state when said timer counts said predetermined time.

4. The communication LSI device according to claim 1, wherein said test control section is set to said test mode in response to a test mode setting signal externally supplied.

5. The communication LSI device according to claim 1, wherein said second reset signal is supplied to said test control section initially once.

6. A method of testing a communication LSI device, comprising:
   (a) setting a test mode;
   (b) generating a first reset signal to a 5 state machine section. in an idle state in said test mode in response to a second reset signal externally supplied;
   (c) carrying out a configuration operation by said state machine section in response to said first reset signal, wherein said state machine section reverts back to said idle state after completion of said configuration operation;
   (d) generating a flag signal from said state machine section when said state machine section has reverted back to said idle state;
   (e) generating a first transmission command in response to a second transmission command externally supplied;
   (f) carrying out a transmission operation by said state machine section in said idle state in response to said first transmission command, wherein said state machine section reverts back to said idle state after completion of said transmission operation; and
   (g) generating said first reset signal to said state machine section in said idle state in said test mode in response to said flag signal.

7. The method according to claim 6, wherein said state machine section includes a timer,
   wherein said generating in step (d) includes:
   generating said flag signal in the idle state when said timer counts a predetermined time after said state machine section enters said idle state.

8. The method according to claim 6, wherein said (a) setting includes:
   setting said test mode in response to a test mode setting signal externally supplied.

9. A communication LSI device comprising:
   a state machine section which carries out a configuration operation in an idle state in response to a first reset signal, and then said state machine section reverts back to said idle state, and carries out a transmission operation in said idle state in response to said first transmission command, and then said state machine section reverts back again to said idle state, and said state machine section outputs a flag signal after a predetermined time after the state machine section reverts back again to said idle state;
   a resetting circuit which generates said first reset signal in response to a second reset signal externally supplied;
   a test control section which outputs a second transmission command in a test mode in response to said flag signal; and
   a link interface section which outputs said first transmission command to said state machine section in response to said second transmission command.

10. The communication LSI device according to claim 9, wherein said state machine section includes a timer, when said timer counts a predetermined time after said state machine section reverts back to said idle state, said state machine section outputs said flag signal in said idle state when said timer counts said predetermined time.

11. The communication LSI device according to claim 9, wherein said test control section is set to said test mode in response to a test mode setting signal externally supplied.

12. The communication LSI device according to claim 9, wherein said third communication command reset signal is supplied to said test control section initially once.

13. A method of testing a communication LSI device, comprising:

(a) setting a-test mode;

(b) generating a first reset signal to a state machine section in an idle state in said test mode in response to a second reset signal externally supplied;

(c) carrying out a configuration operation by said state machine section in response to said first reset signal, wherein said state machine section reverts back said idle state after completion of said configuration operation;

(d) generating a flag signal from said state machine section when said state machine section is in said idle state;

(e) generating a first transmission command in response to said flag signal;

(f) generating a second reset signal to said state machine section in said idle state in said test mode in response to said first transmission command; and (g) carrying out a transmission operation by said state machine section in said idle state in response to said second transmission command, wherein said state machine section reverts back to said idle state after completion of said transmission operation.

14. The method according to claim 13, wherein said state machine section includes a timer, wherein said (d) generating includes:

generating said flag signal in the idle state 5 when said timer counts a predetermined time after said state machine section reverts back to said idle state.

15. The method according to claim 13, wherein said (a) setting includes:

setting said test mode in response to a test mode setting signal externally supplied.

16. The method according to claim 13, further comprising:

generating said first transmission command in response to a third transmission command externally supplied.

* * * * *

UNITED STATES PATENT AND TRADEMARK OFFICE
CERTIFICATE OF CORRECTION

PATENT NO. : 6,675,332 B1
DATED : January 6, 2004
INVENTOR(S) : Koichiro Suzuki and Katsuhara Chiba It is certified that error appears in the above-identified patent and that said Letters Patent is hereby corrected as shown below:

Column 9,
Lines 40 and 46, delete "SA" insert -- 5A --

Column 10,
Line 30, delete "devoice" insert -- device --
Lines 49 and 63, delete "1" insert -- 11 --

Signed and Sealed this

Twenty-fifth Day of May, 2004

JON W. DUDAS
*Acting Director of the United States Patent and Trademark Office*